United States Patent
Wood et al.

(10) Patent No.: US 10,908,438 B1
(45) Date of Patent: Feb. 2, 2021

(54) ELECTROABSORPTION OPTICAL MODULATOR

(71) Applicant: National Technology & Engineering Solutions of Sandia, LLC, Albuquerque, NM (US)

(72) Inventors: Michael Wood, Albuquerque, NM (US); Salvatore Campione, Albuquerque, NM (US); Gordon Arthur Keeler, Falls Church, VA (US); Kent M. Geib, Elbert, CO (US); Joshua Shank, Albuquerque, NM (US); Jon Ihlefeld, Charlottesville, VA (US); Darwin K. Serkland, Albuquerque, NM (US); Ting S. Luk, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 53 days.

(21) Appl. No.: 15/909,767

(22) Filed: Mar. 1, 2018

Related U.S. Application Data (63) Continuation-in-part of application No. 14/880,327, filed on Oct. 12, 2015, now abandoned.

(51) Int. Cl.
*G02F 1/025* (2006.01)
*G02F 1/00* (2006.01)
*G02F 1/015* (2006.01)

(52) U.S. Cl.
CPC ............ *G02F 1/025* (2013.01); *G02F 1/0063* (2013.01); *G02F 1/0081* (2013.01); *G02F 2001/0157* (2013.01)

(58) Field of Classification Search
CPC ...... G02F 1/025; G02F 1/0081; G02F 1/0063; G02F 2001/0157
See application file for complete search history.

(56) References Cited

U.S. PATENT DOCUMENTS

| | | | |
|---|---|---|---|
| 4,974,923 | A | 12/1990 | Colak et al. |
| 5,757,986 | A | 5/1998 | Cramptom et al. |

(Continued)

FOREIGN PATENT DOCUMENTS

CN 103439807 A 12/2013

OTHER PUBLICATIONS

Ebrish et al. Border Trap Characterization in Metal-Oxide-Graphene Capacitors with HfO2 Dielectrics; available at http://people.ece.umn.edu/users/skoester/2013_DRC_Ebrish.pdf (Year: 2013).*

(Continued)

*Primary Examiner* — Peter Radkowski
(74) *Attorney, Agent, or Firm* — Martin I. Finston; Eugene Rosenthal (57) ABSTRACT

An electroabsorption modulator that operates based on electroabsorption of a surface plasmon polariton mode is improved by various structural changes and/or selection of different materials. For example, at least a portion of the waveguide may be made to be conductive, e.g., by doping. Also, layers that make up the modulator structure may be placed along sides of waveguides in addition to or instead of simply on the top thereof. High permittivity gate dielectric materials may be employed. Also, materials other than ITO may be employed as a transparent conductor. Such an improved plasmonic electroabsorption modulator can be fabricated using standard semiconductor processing techniques and may be integrated with standard photonic integrated circuits, including silicon photonics and compound (Continued)

semiconductor-based platforms. Advantageously, high-speed, low-voltage operation over a wide spectrum of wavelengths may be achieved.

11 Claims, 8 Drawing Sheets

(56) References Cited

U.S. PATENT DOCUMENTS

| | | | |
|---|---|---|---|
| 7,480,425 | B2 | 1/2009 | Gunn et al. |
| 7,880,201 | B2 | 2/2011 | Vlasov et al. |
| 8,014,636 | B2 | 9/2011 | Shubin et al. |
| 8,378,465 | B2 | 2/2013 | Vlasov et al. |
| 8,554,022 | B1 * | 10/2013 | Hochberg ......... H01L 29/66977 257/21 |
| 8,767,159 | B2 * | 7/2014 | Kimura ............... G02F 1/13624 349/144 |
| 8,958,678 | B2 | 2/2015 | Thomson et al. |
| 9,002,144 | B2 | 4/2015 | Fujikata et al. |
| 9,042,683 | B2 | 5/2015 | Cho et al. |
| 9,293,627 | B1 | 3/2016 | Beechem, III et al. |
| 9,455,372 | B2 | 9/2016 | Vlasov et al. |
| 2004/0208454 | A1 | 10/2004 | Montgomery et al. |
| 2004/0213307 | A1 | 10/2004 | Lieber et al. |
| 2008/0001062 | A1 | 1/2008 | Gunn et al. |
| 2008/0112032 | A1 | 5/2008 | Vlasov et al. |
| 2009/0235721 | A1 | 9/2009 | Robinson et al. |
| 2010/0215309 | A1 | 8/2010 | Shubin et al. |
| 2010/0291828 | A1 | 11/2010 | Reches et al. |
| 2011/0102068 | A1 | 5/2011 | Bouchiat et al. |
| 2011/0104442 | A1 | 5/2011 | Yoon et al. |
| 2011/0111564 | A1 | 5/2011 | Vlasov et al. |
| 2011/0116168 | A1 | 5/2011 | Nikoobakht et al. |
| 2012/0003767 | A1 | 1/2012 | Fujikata et al. |
| 2012/0043527 | A1 | 2/2012 | Ding et al. |
| 2012/0249907 | A1 * | 10/2012 | Kimura ................ G09G 3/3659 349/38 |
| 2012/0257850 | A1 | 10/2012 | Fujikata et al. |
| 2012/0328237 | A1 | 12/2012 | Ide et al. |
| 2013/0058606 | A1 | 3/2013 | Thomson et al. |
| 2013/0101247 | A1 | 4/2013 | Cho et al. |
| 2013/0143335 | A1 | 6/2013 | Vlasov et al. |
| 2014/0056551 | A1 | 2/2014 | Liu et al. |
| 2015/0301363 | A1 | 10/2015 | Chen et al. |

OTHER PUBLICATIONS

Ding et al., Coupling of plasmon and photon modes in a graphene-based multilayer structure, Opt. Lett. 40, 4524-4527 (2015) (Year: 2015).*
Babicheva et al., Plasmonic modulator optimized by patterning of active layer and tuning permittivity, Optics Communications 285 (2012) 5500-5507 (Year: 2012).*
IPDiA, Integrated Passive Devices Technology Breakthrough by IPDiA, White Paper, 2010 (Year: 2010).*
Xu et al., Low-voltage electro-optic modulator structure using transparent conducting oxide with high conductivity-loss ratio as electrodes, IEEE Conference Avionics Fiber-Optics and Photonics, 2005., Minneapolis, MN, 2005, pp. 77-78. (Year: 2005).*
Liu et al., Double-Layer Graphene Optical Modulator, Nano Lett., 2012,12 (3), pp. 1482-1485. (Year: 2012).*
Mendelsberg, et al., Determining the nonparabolicity factor of the CdO conduction band using indium doping and the Drude theory, J. Phys. D: Appl. Phys. 45 (2012) 425302 (Year: 2012).*
Vasudev et al., Electro-optical modulation of a silicon waveguide with an "epsilon-near-zero" material, Optics Express, V. 21, N. 22, 2013. (Year: 2013).*
Alam, M. Z. et al., "Large optical nonlinearity of indium tin oxide in its epsilon-near-zero region," Science (2016) 10.1126/science. aae0330 (Apr. 28) 6 pages.
Alú, A. et al., "Epsilon-near-zero metamaterials and electromagnetic sources: Tailoring the radiation phase pattern," Phys. Rev. B 75, 155410 (2007) 13 pages.
Argyropoulos, C. et al., "Boosting optical nonlinearities in ϵ-near-zero plasmonic channels," Phys. Rev. B 85, 045129 (2012), 5 pages.
Babicheva, V. E. et al., "Plasmonic modulator optimized by patterning of active layer and tuning permittivity," Optics Communications (2012) 285:5500-5507.
Campione, S. et al., "Theory of epsilon-near-zero modes in ultrathin films," Phys. Rev. B 91, 121408 (2015) 5 pages.
Campione, S. et al., "Ultrafast Epsilon-Near-Zero Electroabsorption Modulators," Sandia National Laboratories (2018) SAND2018-6837C, 1 page.
Campione, S. et al., "Ultrafast Epsilon-Near-Zero Electroabsorption Modulators," Sandia National Laboratories (2018) SAND2018-0303C, 1 page.
Campione, S. et al., "High-Mobility Transparent Conducting Oxides for Compact Epsilon-Near-Zero Silicon Integrated Optical Modulators," Sandia National Laboratories (2017) SAND2017-5730C, 2 Pages.
Campione, S. et al., "High-Mobility Transparent Conducting Oxides for Compact Epsilon-Near-Zero Silicon Integrated Optical Modulators," Sandia National Laboratories (2017) SAND2017-10045C, 1 page.
Campione, S. et al., "Compact Silicon Photonic Phase Modulators based on Epsilon-Near-Zero Materials," Sandia National Laboratories (2018) SAND2018-10976C, 3 pages.
Connelly, M. J. et al., "Modeling of Mach-Zehnder and electroabsorption modulator pulse generators and extration of the chirp factor," 2015 International Conference on Numerical Simulation of Optoelectronic Devices (NUSOD), Taipei, pp. 67-68.
Ding, L. et al., "Coupling of plasmon and photon modes in a graphene-based multilayer structure," Optics Letters (2015) 40:4524-4527.
Ebrish, M.A. et al., "Border Trap Characterization in Metal-Oxide-Graphene Capacitors with HfO2 Dielectrics," available at http://people.ece.umn.edu/users/skoester/2013_DRC_Ebrish_pdf (Year: 2013) 2 pages.
Freeman, A. J. et al., "Chemical and Thin-Film Strategies for New Transparent Conducting Oxides," MRS Bulletin (Aug. 2000), pp. 45-51.
Keeler, G. A. et al., "High-Speed Operation of a Compact ENZ Electroabsorption Modulator Based on Transparent Conducting Oxides," Sandia National Laboratories (2016) SAND2016-12960C, 1 page.
Kinsey, N. et al., "Epsilon-near-zero Al-doped ZnO for ultrafast switching at telecom wavelengths," Optica (2015) 2 (7):616-622.
Lu, Z. et al., "Nanoscale field effect optical modulators based on depletion of epsilon-near-zero-films," Optics Communications (2016) 381:18-23.
Maas, R. et al., Experimental realization of an epsilon-near-zero metamaterial at visible wavelengths, Nature Photonics (2013) 7:907-912.
Mendelsberg, R. J. et al., "Determining the nonparabolicity factor of the CdO conduction band using indium doping and the Drude theory," J. Phys. D.: Appl. Phys. (2012) 45:425302, 12 pages.
Park, J. et al., "Electrically Tunable Epsilon-Near-Zero-(ENZ) Metafilm Absorbers," Scientific Reports (2015) 5:15754, 9 pages.
Reines, I. C. et al., "Compact epsilon-near-zero silicon photonic phase modulators," Optics Express (2018) 26:21594-21605.
Schrenk, B. et al., "Flexible Optical QAM Generation with a Low-Complexity Amplified InP SOA/EAM-Based Modulator," ECOC Technical Digest (2012) Tuy.4.A.6.pdf, 3 pages.
Shi, K. et al., "Broadband electro-otpical modulator based on transparent conducting oxide," Optics Letters (2014) 39 (17):4978-4981.
Timurdogan, E. et al., "An ultralow power athermal silicon modulator," Nature Communications (2014) 5:4008, 11 pages.
Vassant, S. et al., "Berreman mode and epsilon near zero mode," Optics Express (2012) 20:23971-.23977.
Vasudev, A. P. et al., "Electro-optical modulation of a silicon waveguide with an "epsilon-near-zero" material," Optics Express (2013) 21(22):26387-26397.

(56) References Cited

OTHER PUBLICATIONS

2018 Wood Optica GHz speed operation of ENZ SiPh modulators.
Babicheva, et al., "Towards CMOS-compatible nanophotonics: Ultra-compact modulators using alternative plasmonic materials", Optics Express, Nov. 4, 2013, vol. 21, No. 22, pp. 27326-27337.
Boltasseva, A. et al., "Low-loss plasmonic metamaterials," Science, vol. 331, pp. 290-291, 2011.
Campione, S. et al., "Electric field enhancement in ϵ-near-zero slabs under TM-polarized oblique incidence," Phys. Rev. B, 2013, vol. 87.
Campione, S. et al., "Submicrometer Epsilon-Near-Zero Electroabsorption Modulators Enabled by High-Mobility Cadmium Oxide" IEEE Photonics Journal, 2017, vol. 9, 6601307.
Feigenbaum et al., "Unity-Order Index Change in Transparent Conducting Oxides at Visible Frequencies", NanoLetters 2010, vol. 10, pp. 2111-2116.
Hoessbacher et al., "The plasmonic memristor: a latching optical switch", Optica, vol. 1, No. 4, pp. 198-202, Oct. 2014.
Huant et al., "A Sub-λ-Size Modulator Beyond the Efficiency-Loss Limit", IEEE Photonics Journal, vol. 5, No. 4, Aug. 2013.
G. A. Keeler et al., "Multi-gigabit operation of a compact, broadband modulator based on ENZ confinement in indium oxide," in Proc. Opt. Fiber Commun. Conf., Los Angeles, CA, USA, 2017, Paper Th3I.1.
Kik et al., "Design and performance of an erbium-doped silicon waveguide detector operating at 1.5 um," in Journal of Lightwave Technology, vol. 20, No. 5, pp. 862-867, May 2002.
Koch, U. et al. "Digital plasmonic absorption modulator exploiting epsilon-near-zero in transparent conducting oxides," IEEE Photon. J., vol. 8, No. 1, Feb. 2016.
Lee et al., "Nanoscale Conducting Oxide PlasMOStor, NANOLetters", vol. 14, 2014, pp, 6463-6468.
Liu et al., "A graphene-based broadband optical modulator", Nature vol. 474, pp. 64-67, Jun. 2, 2011.
Liu et al., "Double-Layer Graphene Optical Modulator", Nano Lett., 2012, 12 (3), pp. 1482-1485.
Liu et al., "A high-speed silicon optical modulator based on a metal-oxide-semiconductor capacitor", Nature, Feb. 12, 2004;427(6975):615-8.
Lu et al., "Ultracompact Electroabsorption Modulators Based on Tunable Epsilon-Near-Zero-Slot Waveguides", IEEE Photonics Journal, pp. 735-740, vol. 4, No. 3, Jun. 2012.
Melikyan et al., "Surface plasmon polariton absorption modulator", Optics Express, 2011, vol. 19, pp. 8855-8869.
Piper, L.F. et al. "Observation of quantized subband states and evidence for surface electron accumulation in CdO from angle-resolved photoemission spectroscopy", Physical Review B, 2008, vol. 78, 165127.
Phare et al., "Graphene electro-optic modulator with 30 GHz bandwidth", Nature Photonics, 2015, vol. 9, p. 511 (submitted on Nov. 7, 2014 to http://arxiv.org/abs/1411.2053).
Sachet, E. et al., "Dysprosium-doped cadmium oxide as a gateway material for mid-infrared plasmonics," Nature Mater., 2015, vol. 14, pp. 414-420.
Shi, K. et al., "Field-effect optical modulation based on epsilon-near-zero conductive oxide," Opt. Commun., 2016, vol. 370, pp. 22-28.
Sorger, V. et al., Ultra-compact silicon nanophotonic modulator with broadband response, Nanophotonics vol. 1: pp. 17-22, Sep. 2012.
Das, S. et al., "Tunable Nano-photonic Devices", Dissertation, University of Kansas, 2016, available at https://www.ittc.ku.edu/research/thesis/documents/Susobhan_Das_thesis.pdf.
Zhu, S. et al., "Design of an ultra-compact electro-absorption modulator comprised of a deposited TiN/Hf02/ITO/Cu stack for CMOS backend integration", Optics Express, 2014, vol. 22, p. 17930.

\* cited by examiner

ELECTROABSORPTION OPTICAL MODULATOR

REFERENCE TO RELATED APPLICATION

This application is a continuation-in-part of prior application Ser. No. 14/880,327, which was filed on Oct. 12, 2015 by Gordon Arthur Keeler et al. under the title, "Electroabsorption Optical Modulator", and which is commonly owned herewith. The entirety of the above said application Ser. No. 14/880,327 is hereby incorporated herein by reference.

GOVERNMENT RIGHTS IN THIS INVENTION

This invention was made with United States Government support under Contract No. DE-NA0003525 between National Technology & Engineering Solutions of Sandia, LLC and the United States Department of Energy/National Nuclear Security Administration. The United States Government has certain rights in this invention.

TECHNICAL FIELD

This invention relates to optical modulators, and more particularly, to electroabsorption optical modulators.

BACKGROUND OF THE INVENTION

An optical modulator is a device that can be used for manipulating a property of light, often of an optical beam, e.g. a laser beam. Depending on which property of light is controlled, modulators may be intensity modulators, phase modulators, polarization modulators, spatial light modulators, and so forth. A wide range of optical modulators are used in very different application areas, such as in optical fiber communications, displays, mode locking of lasers, and the like.

An electroabsorption modulator is a device which can be used for modulating the intensity of a light beam in response to an applied voltage. Such devices are often useful for fiber optic communications.

It is known that an optical modulator can be made that operates based on electroabsorption of a surface plasmon polariton, also known simply as "plasmon" or "plasmonic" mode, by an induced layer of free carriers in a transparent conducting oxide layer and, in particular, indium-tin-oxide (ITO) layer. Such a plasmonic electroabsorption modulator can be fabricated using standard semiconductor processing techniques and may be integrated with standard photonic integrated circuits, including silicon photonics and compound semiconductor-based platforms.

SUMMARY OF THE INVENTION

We have recognized that an electroabsorption modulator that operates based on electroabsorption of a surface plasmon polariton mode can be improved by various structural changes and/or selection of different materials. For example, in various embodiments of the invention at least a portion of the waveguide may be made to be conductive, e.g., by doping. In other embodiments of the invention, layers that make up the modulator structure may be placed along sides of waveguides in addition to or instead of simply placing them on the top thereof. In further embodiments of the invention a so-called "high permittivity" or "high-k" gate dielectric material may be employed. Also, materials other than ITO may be employed as a transparent conductor. Such an improved plasmonic electroabsorption modulator can be fabricated using standard semiconductor processing techniques and may be integrated with standard photonic integrated circuits, including silicon photonics and compound semiconductor-based platforms. Advantageously, high-speed, low-voltage operation over a wide spectrum of wavelengths may be achieved.

In embodiments of the invention, the electroabsorption modulator structure has specific layers arranged on one or more "sides" of a semiconductor optical waveguide, e.g., a single-mode semiconductor optical waveguide. As used herein, the term "side" refers to any of one or more lateral sides and/or the top of the waveguide, but not to the bottom of the waveguide, the bottom being attached to the substrate layer. Such an arrangement may be achieved by sequentially coating the most exterior layer that is adjacent to the side of the waveguide with the next layer of the structure so as to build up the structure.

At least a layer of the semiconductor of the waveguide may be made more conductive, e.g., via doping. The doping is performed at least along any "side" of the waveguide that is covered with gate dielectric and transparent conductor, as described hereinbelow.

A first electrical contact, a so-called "bottom" contact, with low resistance to the doped semiconductor layer, may be formed on the silicon substrate near the waveguide. Such a bottom contact may be formed as close as possible to the rest of the modulator structure without forming a short circuit between the first electrical contact and the rest of the modulator structure, e.g., the transparent conductor and/or second contact, as described hereinbelow.

A thin dielectric layer, i.e. a so-called "gate dielectric layer", is formed on one or more sides of the waveguide. In exemplary embodiments of the invention, the gate dielectric material has a high permittivity, i.e., in a range of about 4-10 or greater, and is transparent over the operating wavelengths of the modulator.

Next, a layer of transparent conductor material is formed on one or more sides of the waveguide. The transparent conductor material should have low optical loss at the operating wavelength when no electric field is present, e.g., indium oxide ($In_2O_3$) for operation at a wavelength of 1550 nm.

The gate dielectric material acts as an insulating layer that prevents the flow of DC electrical current between the doped semiconductor and the transparent conductor.

A second contact, a so-called "top" contact, with low resistance to the transparent conductor layer where the second contact and transparent conductor come into contact, is formed on one or more sides of the waveguide. The top contact is formed using a metal such as gold that has low optical losses at the operating wavelength. The top contact is used for applying a signal that controls the modulation of the electric field across the gate dielectric yet with very little DC current flow through the device. Simultaneously, the top contact becomes part of the plasmonic waveguide and so it thereby cooperates with the other layers to provide a strong optical confinement in the transparent conductor layer by supporting a plasmonic or photonic/plasmonic hybrid waveguide mode in the section of the waveguide where the modulation takes place.

The doped semiconductor layer, the gate dielectric layer, and the transparent conductor layer together form a capacitor in which the doped semiconductor layer constitutes the bottom plate of the capacitor and the transparent conductor layer (together with the metallic top contact) constitutes the top plate of the capacitor. Significantly, the bottom plate in such an arrangement does not include a layer of metal, and the gate dielectric layer can be applied directly onto the doped semiconductor layer.

The top and bottom contacts allow an electrical field to be placed across this capacitor. By changing the electrical bias across the capacitor, the density of electrical carriers, e.g., electrons, in the transparent conductor may be adjusted, and an accumulation of carriers may be formed in the transparent conductor near its interface with the gate dielectric. If sufficiently high, e.g., greater than $1 \times 10^{20}$ cm$^{-3}$, this accumulation of carriers may significantly increase the optical loss within the modulator. Depending on the arrangement of the layers described, e.g., placement on the top and/or lateral sides of the waveguide, modulation of transverse magnetic (TM) and/or transverse electric (TE) polarized light is possible.

The gate dielectric layer and the transparent conductor layer may be viewed together as constituting a bilayer. In other embodiments of the invention, this bilayer can be inverted relative to the structure described hereinabove. In such an embodiment of the invention, the gate dielectric separates the top contact from the transparent conductor layer. The first, "bottom" contact may be made directly to the transparent conductor, and the doped semiconductor region could be omitted. Importantly, the bottom plate of the capacitor in such an arrangement does not include a layer of metal in direct contact with the top side or any lateral side of the semiconductor waveguide. Instead, the transparent conductor can be applied directly onto the semiconductor waveguide, including onto the top side and/or one or more lateral sides, and the bottom contact made by way, e.g., of a metal layer deposited at a position that is offset from the active region of the modulator.

In embodiments of the invention, the transparent conductor layer is composed of cadmium oxide. In embodiments, a cadmium oxide transparent conductor layer is paired with a gate dielectric layer of magnesium oxide.

BRIEF DESCRIPTION OF THE DRAWING

In the drawing:

FIGS. 1A and 1B show exemplary electroabsorption modulator arranged in accordance with the principles of the invention where

FIGS. 8A and 8B are comparative plots obtained from numerical simulations of an example device of the kind described here.

DETAILED DESCRIPTION

The following merely illustrates the principles of the invention. It will thus be appreciated that those skilled in the art will be able to devise various arrangements that, although not explicitly described or shown herein, embody the principles of the invention and are included within its spirit and scope. Furthermore, all examples and conditional language recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry or components embodying the principles of the invention. Similarly, it will be appreciated that any flow charts, flow diagrams, state transition diagrams, pseudocode, process descriptions and the like represent various processes which may be substantially represented in computer readable medium and so executed by a computer or processor, whether or not such computer or processor is explicitly shown.

Unless otherwise explicitly specified herein, the drawings are not drawn to scale.

In the description, identically numbered components within different ones of the FIGs. refer to the same components.

We have recognized that an electroabsorption modulator that operates based on electroabsorption of a surface plasmon polariton mode can be improved by various structural changes and/or selection of different materials. For example, in various embodiments of the invention at least a portion of the waveguide may be made to be conductive, e.g., by doping. In other embodiments of the invention, layers that make up the modulator structure may be placed along sides of waveguides in addition to or instead of simply placing them on the top thereof.

In further embodiments of the invention a so-called "high permittivity" or "high-k" gate dielectric materials may be employed. Also, materials other than ITO may be employed as a transparent conductor. Such an improved plasmonic electroabsorption modulator can be fabricated using standard semiconductor processing techniques and may be integrated with standard photonic integrated circuits, including silicon photonics and compound semiconductor-based platforms. Advantageously, high-speed, low-voltage operation over a wide spectrum of wavelengths may be achieved.

In embodiments of the invention, the electroabsorption modulator structure has specific layers arranged on one or more "sides" of a semiconductor optical waveguide, e.g., a single-mode semiconductor optical waveguide. As noted, a "side" may be any of one or more lateral sides and/or the top of the waveguide but it is not the bottom of the waveguide, the bottom being attached to the substrate layer. Such an arrangement may be achieved by sequentially coating the most exterior layer that is adjacent to the side of the waveguide with the next layer of the structure so as to build up the structure.

The waveguide may be a semiconductor optical waveguide and may be a single mode waveguide. Exemplary such waveguides include strip waveguides, ridge waveguides, or buried channel waveguides.

Figure 1A:
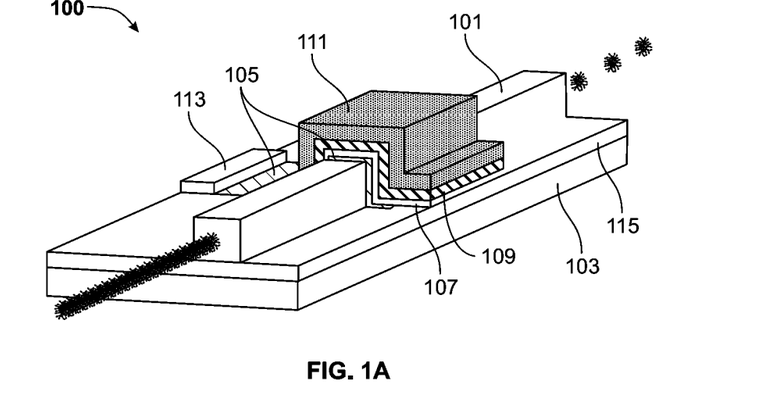
FIG. 1A is a perspective view of the electroabsorption modulator and FIG. 1B is a cross section of the electroabsorption modulator.
Figure 1B:
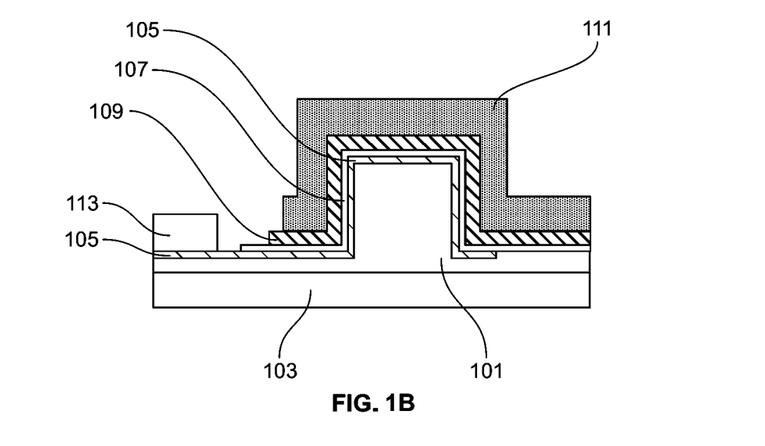

FIGS. 1A and 1B show exemplary electroabsorption modulator 100 arranged in accordance with the principles of the invention. More specifically, FIG. 1A is a perspective view of electroabsorption modulator 100 and FIG. 1B is a cross section of electroabsorption modulator 100. In the exemplary embodiment of the invention shown in FIGS. 1A and 1B, the semiconductor optical waveguide is silicon ridge waveguide 101 formed on buried oxide layer 103. Waveguide 101 is formed by etching silicon of a silicon-on-insulator (SOI) wafer. The dimensions of waveguide 101 may be in a range of between about 150 nm and about 1000 nm in both transverse dimensions. Thus, silicon layer 115 on buried oxide layer 103 has protruding therefrom silicon waveguide 101 in the manner shown in FIGS. 1A and 1B.

Although the entire structure 100 is referred to here as an exemplary electroabsorption modulator 100, the particular part of waveguide 101 on which the various layers are placed along with those layers may also be referred to herein as the electroabsorption modulator or just the modulator. Those of ordinary skill in the art will readily recognize this. An analogy is to a conventional resistor, which has an input, an output, an insulating cover and inside a resistive material, although actually, only the resistive material provides the resistive function.

In the conventional manner, a dielectric cladding of, e.g., $SiO_2$ (omitted from the figure so as to make the underlying structure visible) may surround the semiconductor waveguide on one or more of its sides. Such a dielectric cladding may be put on at one of several points in the process of forming the modulator structure, e.g., before the rest of the modulator structure is formed and then removed in the area of the modulator or it may be applied after the modulator is completed.

In some embodiments of the invention, at least a layer of semiconductor waveguide 101 that is part of the modulator may be made more conductive, e.g., via doping. The doping is performed at least along any one or more "sides" of the waveguide that is covered with gate dielectric and transparent conductor, as described hereinbelow. The entire waveguide section may be doped, i.e., the entire section of the waveguide within the modulator may be doped throughout its cross section.

The doping may be performed, for example, using implantation. In one embodiment of the invention, the doping is performed so as to form a p-type layer. In other another embodiment of the invention, an n-type doping is employed to form an n-type layer.

In the manner shown in FIGS. 1A and 1B, although perhaps a bit difficult to see because of the perspectives and the need to show all the regions, doped region 105 of waveguide 101 is within the cross section of waveguide 101. In addition, in embodiments of the invention, the doping which is used to form doped region 105 within the cross section of waveguide 101 may be extended outward from waveguide 101 into silicon layer 115.

A first electrical contact, i.e. a so-called "bottom" contact 113, with low resistance to doped semiconductor layer 105 which is extended in silicon layer 115 from waveguide 101, may be formed on doped silicon layer 105 of silicon layer 115 near waveguide 101. For example, bottom contact 113 may be formed as close as possible to the rest of the modulator structure without forming a short circuit between the bottom contact 113 and the rest of the modulator structure, e.g., the transparent conductor and/or second contact as described below.

Bottom contact 113 may be formed using silicide, metal, high doping implants, and the like, and is used to form a low resistance path between metal wiring (not shown) that will be affixed thereto in the conventional manner to carry control signals and doped semiconductor region 105 that is within optical waveguide 101 and makes up the top and/or one or more of its sides. In other words, doped portion 105 of waveguide 101 may be extended beyond waveguide 101 in the exemplary manner shown in FIG. 1A and FIG. 1B. Doing so allows bottom contact 113 to be formed lateral to waveguide 101 and in close proximity thereto.

Thin dielectric layer 107, also known as "gate dielectric layer" 107, is formed on one or more sides of the waveguide. In exemplary embodiments of the invention, the gate dielectric material has a high permittivity, i.e., in a range of about 4-10 or greater. Also, in exemplary embodiments of the invention, the gate dielectric material is substantially transparent over the operating wavelengths of the modulator. Exemplary materials suitable for use as the dielectric material include 1) hafnium dioxide ($HfO_2$), 2) aluminum oxide ($Al_2O_3$), 3) hafnium silicon oxynitride (HfSiON), 4) combinations and derivations of the foregoing materials, and 5) the like.

In one exemplary embodiment of the invention, gate dielectric layer 107 is made of $HfO_2$ that has a thickness in the range of about 3 nm to about 10 nm and which was deposited by atomic layer deposition. The high permittivity dielectric material of dielectric layer 107 is arranged to be in contact with, e.g., coating, immediately adjacent doped semiconductor layer 105 on one or more sides of waveguide 101.

Transparent conductor layer 109 is arranged to be in contact with gate dielectric layer 107, exemplarily as a coating located on one or more immediately adjacent sides of waveguide 101. Transparent conductor layer 109 need not coat all of gate dielectric layer 107. In some embodiments of the invention, transparent conductor layer 109 is on the "top" side of waveguide 101, as well as on the two lateral "sides" thereof, but is not on the "bottom" side thereof, which is the part of waveguide 101 closest to silicon layer 115 of which the waveguide is formed on buried oxide layer 103.

The material employed for transparent conductor layer 109 should a) have low optical loss over the operating wavelengths of the modulator, e.g., without an applied electric field, but b) become highly lossy when its carrier density is increased during operation by the application of an electrical control signal. Exemplary materials from which layer of transparent conductor 109 may be formed include 1) transparent conducting oxides such as indium oxide ($In_2O_3$), tin oxide ($SnO_2$), and indium tin oxide (ITO); 2) zinc oxide ($ZnO_2$) and doped zinc oxides such as aluminum doped zinc oxide, also known as AZO, gallium doped zinc oxide, also known as GZO, indium doped zinc oxide, also known as IZO; 3) graphene; 4) combinations and derivations of these materials; and 5) the like.

In various embodiments of the invention, the material for transparent conductor layer 109 is selected so as to have a carrier concentration that is moderately high, e.g., $1\times10^{19}$ cm$^3$, but low enough such that it has a plasma wavelength longer than the operating wavelength of modulator 101. Wavelengths particularly suitable for modulation by modulator 101 include those in the range from about the visible through about the midwave infrared, and preferably in the near or shortwave infrared, e.g., in a range between about 750 nm through about 3 µm. In one exemplary embodiment of the invention designed for operation using a wavelength of about 1550 nm, transparent conductor layer 109 is formed using 5 nm to 20 nm of indium oxide, which is deposited by sputtering under conditions that achieve a nominal carrier density of about $1\times10^{19}$ cm$^{-3}$.

Gate dielectric layer 107 acts as an insulating layer and is placed so that it substantially prevents the flow of DC electrical current between doped semiconductor layer 105 and transparent conductor layer 109.

Second contact 111, also known as "top" contact 111, which has a low resistance to transparent conductor layer 109, is formed on one or more sides of waveguide 101, coating transparent conductor layer 109. Top contact 111 is formed of a metal with low optical losses at the operating wavelength. Exemplary materials from which the top contact may be formed include 1) gold, silver, copper, and aluminum; 2) doped semiconductors; 3) titanium nitride; 4) combinations and derivations of these materials; and 5) the like.

Top contact 111 is used for applying a signal which controls modulation of the electric field across gate dielectric layer 107 with very little DC current flow. Additionally, top contact 111 simultaneously becomes part of the plasmonic waveguide. As such, top contact 111 helps, along with layers 105, 107, and 109, to provide a strong optical confinement in the transparent conductor layer by supporting a plasmonic or photonic/plasmonic hybrid waveguide mode in the section of waveguide 101 where modulation takes place, i.e., in the region of waveguide 101 adjacent to layers 105, 107, and 109.

A metal connection, e.g., a wire or a conductive via (not shown in the figure) may be connected in a conventional manner to any part of top metallic contact 111. In embodiments of the invention, top metallic contact 111 may extend off of waveguide 101 and further onto the layers extending onto silicon layer 115, e.g., as shown in FIGS. 1A and 1B, in order to facilitate the connection to the metal wire or a conductive via from a different layer to enable application of an electric bias, e.g., from an external circuit. In an exemplary embodiment of the invention, top metallic contact 111 is made of a deposited layer of gold with a thickness having a range of between about 50 nm and about 1000 nm and with a length parallel to the waveguide in a range of about 1-20 µm.

Doped semiconductor layer 105, gate dielectric layer 107, and transparent conductor layer 109 together form a capacitor. The doped semiconductor layer 105 constitutes the bottom plate of the capacitor and the transparent conductor layer 109 (together with the top metallic contact 111) constitutes the top plate of the capacitor. Significantly, the bottom plate in such an arrangement does not include a layer of metal, and the gate dielectric layer can be applied directly onto the doped semiconductor layer. In such an arrangement, the bottom metal contact 113 may be deposited at a position that is offset from the active region of the modulator.

The gate dielectric layer 107 and the transparent conductor layer 109 may be viewed together as constituting a bilayer. In other embodiments of the invention, as will be seen below, this bilayer can be inverted relative to the structure described above.

Top contact 111 and bottom contact 113 enable application of an electrical field across this capacitor. By changing the electrical bias, the amount of change which is required depending on the thickness of the various layers, e.g., in a range between about −5 V to about +5 V, the density of electrical carriers, e.g., electrons, in transparent conductor layer 109 can be controlled, and an accumulation of carriers can be formed in transparent conductor layer 109 near its interface with gate dielectric layer 107.

If the density of electrical carriers is sufficiently high, e.g., greater than $1\times10^{20}$ cm$^{-3}$, such an accumulation of carriers may significantly increase the optical loss of the modulator. Depending on the arrangement of the layers described, e.g., placement on the top and/or lateral sides of the waveguide, modulation of transverse magnetic (TM) and/or transverse electric (TE) polarized light is possible.

In the manner shown in FIG. 1A, continuous wave (CW) light is input to modulator 101 and modulated output light exits at the other end, where the modulation depends on the voltage applied between bottom contact 113 and gate contact 111.

Figure 2A:
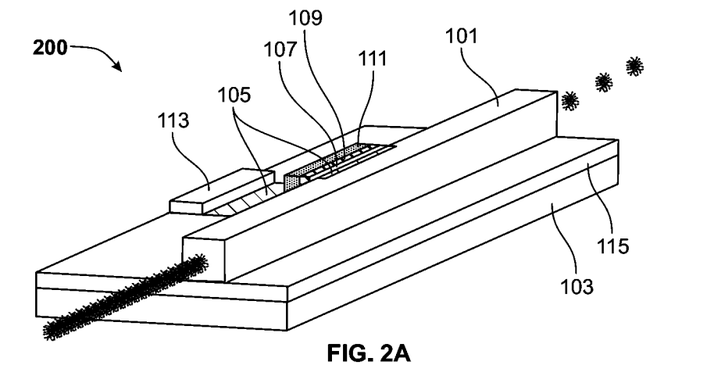
FIGS. 2A and 2B show a modulator, in respective perspective and cross-sectional views, arranged in accordance with the principles of the invention and which is similar to the modulator of FIGS. 1A and 1B but in which the various layers of the structure that make up the modulator in FIGS. 2A and 2B are only on one side of the waveguide of FIGS. 2A and 2B.
Figure 2B:
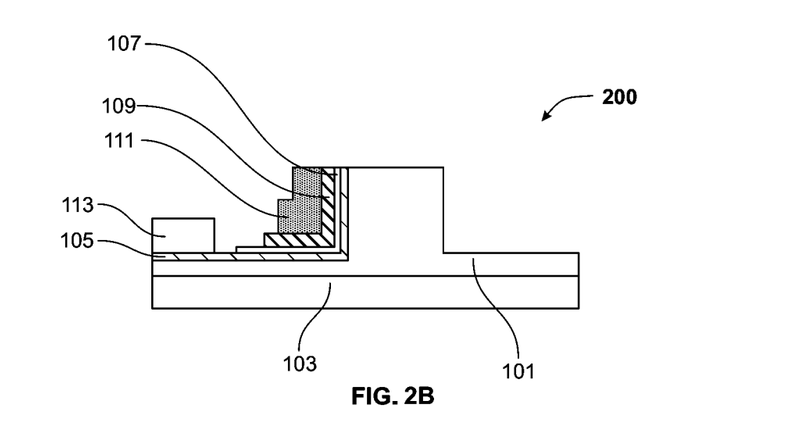

FIGS. 2A and 2B show modulator 200 arranged in accordance with the principles of the invention and which is similar to modulator 100 of FIGS. 1A and 1B. However, the various layers of the structure that make up modulator 200 are only on one side of waveguide 101.

Figure 3A:
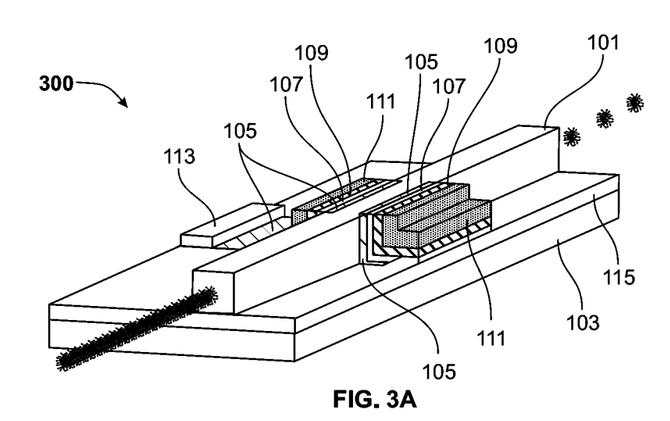
FIGS. 3A and 3B show a modulator, in respective perspective and cross-sectional views, arranged in accordance with the principles of the invention and which is similar to the modulator of FIGS. 1A and 1B but in which the various layers of the structure that make up the modulator in FIGS. 2A and 2B are only on both sides of the waveguide of FIGS. 3A and 3B.
Figure 3B:
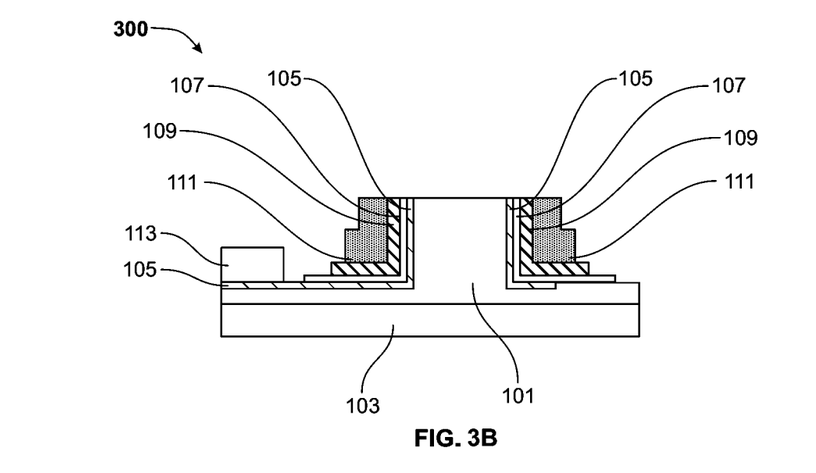

FIGS. 3A and 3B show modulator 300 arranged in accordance with the principles of the invention and which is similar to modulator 100 of FIGS. 1A and 1B. However, the various layers of the structure that make up modulator 300 are only on both sides of waveguide 101 but not on the top thereof. To achieve such an embodiment, doped layer 105 may need to extend within waveguide 101 so that both sides of waveguide are electrically connected.

Alternatively, an additional bottom contact (not shown) may be formed on the opposite side of waveguide 101 from bottom contact 113 on an extension of doped layer 105 similar to extension of doped silicon 105 shown in FIGS. 3A and 3B and both bottom contacts can be coupled by a wire. Furthermore, both gate contacts 111 need to be coupled together by a wire or a via, neither of which is shown.

In the embodiments of the invention shown in FIGS. 1A 1B, 2A, 2B, 3A, and 3B, the modulator advantageously operates in one or more hybrid plasmonic-photonic modes of TE polarization, which is the most commonly used polarization mode with integrated silicon photonics. Advantageously, the embodiment of the invention shown in FIGS. 1A and 1B may be operated in one or more hybrid plasmonic-photonic modes of TE and TM polarization making the optical modulator more broadly usable.

The speed of the modulator, i.e., the rate at which the modulator can be switched from largely absorbing propagating light to largely transmitting propagating light, is typically limited mostly by resistance-capacitance (RC) charging times, wherein the capacitor is the capacitor formed in the modulator and the resistor is the resistance off all of the inductors leading up to the capacitor, and possibly (although less likely) by carrier transit effects. In order to achieve high-speed modulation, e.g., at rates beyond the 1 GHz range, both the resistance and capacitance of the modulator should be minimized. These properties can be minimized using conventional techniques for optical device design and semiconductor device design.

As noted above, the gate dielectric layer and the transparent conductor layer may be viewed together as constituting a bilayer, which can be inverted in alternate embodiments of the invention.

Figure 4:
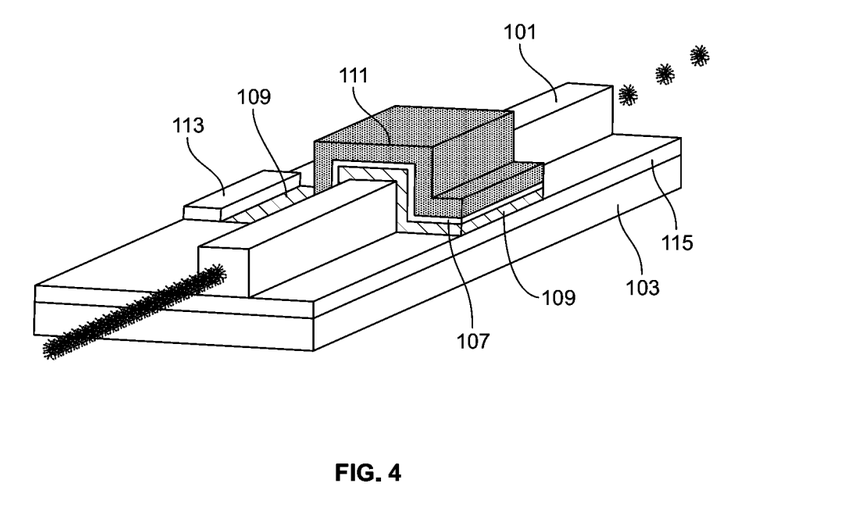
FIG. 4 shows another embodiment of the invention in which a layer of the modulator of FIGS. 1A and 1B is eliminated and two other layers of the modulator of FIGS. 1A and 1B have their positions transposed.

Accordingly, FIG. 4 shows an embodiment of the invention in which doped semiconductor layer 105 has been omitted and gate dielectric layer 107 and transparent conductor layer 109 have their positions transposed. The various layers extend along lateral sides of waveguide 101.

In such an embodiment, gate dielectric layer 107 now separates top contact 111 from transparent conductor layer 109. Transparent conductor layer 109 is coupled to bottom contact 113. The capacitor is formed between transparent conductor layer 109, gate dielectric layer 107 and top contact 111.

Importantly, the bottom plate of the capacitor in such an arrangement does not include a layer of metal. Instead, the transparent conductor can be applied directly onto the semiconductor waveguide. In such an arrangement, the bottom contact may be made by way, e.g., of a metal layer deposited on transparent conductor layer 109 at a position that is offset from the active region of the modulator.

As noted above, it is desirable for the transparent conductor layer to exhibit low optical loss over the operating wavelengths of the modulator in the absence of an applied electric field, but to exhibit high loss when an applied field causes the carrier density to increase.

Indium oxide, for example, is advantageous because it exhibits these properties at wavelengths in the near-infrared part of the spectrum. Indeed, suitable bias with an applied electric field can produce high loss near 1550 nm, which is a near-infrared wavelength of particular interest.

Further, a transparent conductor layer of indium oxide can be made with a nominal carrier density of about $1 \times 10^{19}$ cm$^{-3}$, which provides good conductivity while still offering a plasma wavelength longer than 1550 nm or other desired operating wavelengths of the modulator.

Indium oxide is an example of an epsilon-near-zero (ENZ) optical material. That is, a suitable gate bias can shift the plasma frequency of indium oxide into the ENZ regime with an optical wavelength within the operating range of the modulator. At the ENZ condition, the real part of the frequency-dependent permittivity goes to zero, which increases optical confinement and produces greater optical loss due to free carrier absorption.

The well-known Drude model is useful for understanding how the permittivity depends on optical angular frequency $\omega$. According to the Drude model, the complex permittivity $\varepsilon_{Drude}(\omega)$ of an electrical conductor is given in terms of the high-frequency permittivity $\varepsilon_\infty$, the plasma frequency $\omega_p$, and a damping rate $\gamma$ by:

$$\varepsilon_{Drude}(\omega) = \varepsilon_\infty - [\omega_p^2/\omega(\omega+i\gamma)]$$

The Drude model predicts that near the plasma resonance, the real part of the permittivity will cross from positive values to negative values as the wavelength increases. This is referred to as an ENZ crossing. This behavior has been observed in indium oxide and other transparent conducting oxides.

The Drude model parameters for unbiased indium oxide are given by Table 1:

TABLE 1

| $\varepsilon_\infty$ | $\omega_{p\ (rad/s)}$ | $\gamma\ (rad/s)$ |
|---|---|---|
| 3.6 | $7.00 \times 10^{14}$ | $3.00 \times 10^{14}$ |

The Drude model parameters for biased indium oxide are given by Table 2:

TABLE 2

| $\varepsilon_\infty$ | $\omega_{p\ (rad/s)}$ | $\gamma\ (rad/s)$ |
|---|---|---|
| 3.4 | $2.31 \times 10^{15}$ | $3.05 \times 10^{14}$ |

Indium oxide, with a static carrier concentration density of about $10^{19}$ cm$^{-3}$, has a mid-infrared plasma frequency. However, a suitable bias can cause an accumulation region to form near the interface with the gate dielectric. The electron density in the accumulation layer can reach approximately $10^{21}$ cm$^{-3}$, which is sufficient to blue shift the ENZ crossing to a near-infrared wavelength.

We have observed similar behavior in cadmium oxide (CdO). CdO is a known ENZ material. However, we believe we are the first to suggest using CdO as the transparent conducting oxide in a non-resonant electroabsorption modulator as described here.

The Drude model parameters for unbiased cadmium oxide are given by Table 3:

TABLE 3

| $\varepsilon_\infty$ | $\omega_{p\ (rad/s)}$ | $\gamma\ (rad/s)$ |
|---|---|---|
| 5.5 | $1.73 \times 10^{15}$ | $1.77 \times 10^{13}$ |

The Drude model parameters for biased cadmium oxide are given by Table 4:

TABLE 4

| $\varepsilon_\infty$ | $\omega_{p\ (rad/s)}$ | $\gamma\ (rad/s)$ |
|---|---|---|
| 5.5 | $2.85 \times 10^{15}$ | $3.35 \times 10^{13}$ |

Figure 5:
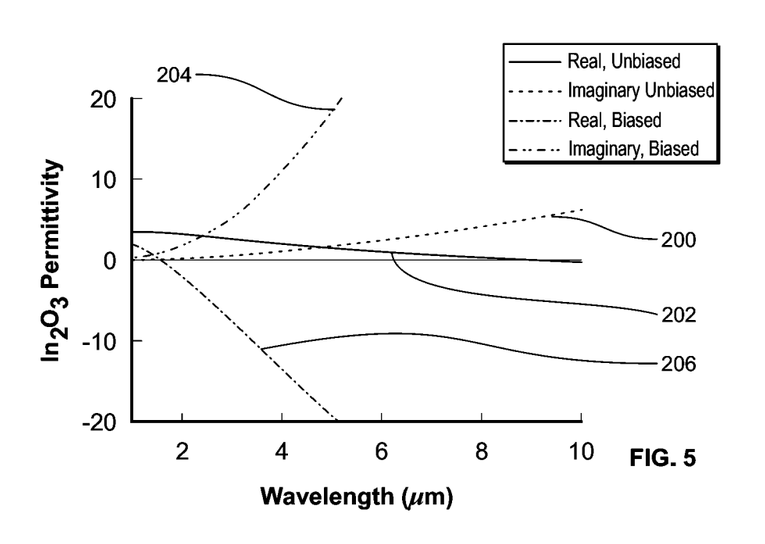
FIGS. 5 and 6 are plots of the permittivity of indium oxide and of cadmium oxide according to a Drude model.
Figure 6:
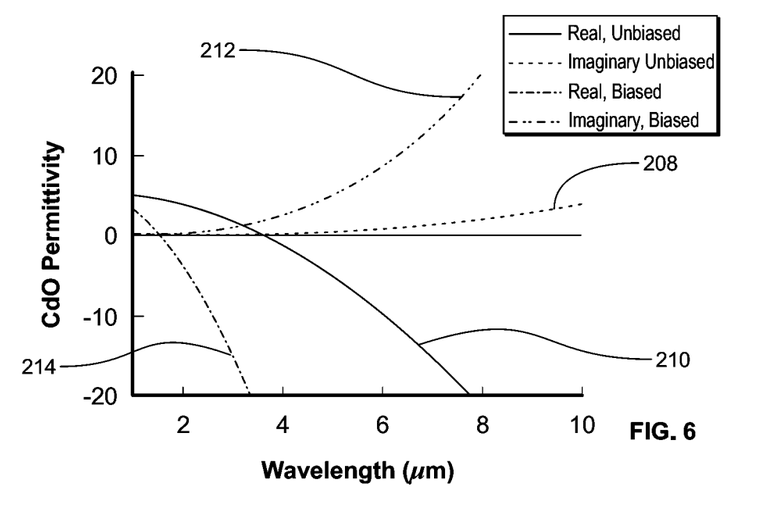

FIGS. 5 and 6 are plots of the modeled permittivities of indium oxide and CdO, respectively, using the Drude model parameters listed above. The permittivities are plotted versus wavelength. In FIG. 5, curves 200 and 202 respectively represent the imaginary part and the real part of the indium oxide permittivity in the unbiased state. Curves 204 and 206 respectively represent the imaginary part and the real part of the indium oxide permittivity under bias. Similarly, curves 208 and 210 of FIG. 6 respectively represent the imaginary part and the real part of the CdO permittivity in the unbiased state. Curves 212 and 214 respectively represent the imaginary part and the real part of the CdO permittivity under bias.

It will be understood from the figure that in the unbiased state, the indium oxide permittivity has an ENZ crossing at 8.8 μm, and it behaves as a dielectric at 1.55 μm. In the unbiased state, the CdO permittivity has an ENZ crossing at 3.6 μm, and it also behaves as a dielectric at 1.55 μm.

With further reference to the figure, it will be seen that under bias, both of the ENZ crossings are shifted to 1.55 μm, which, as noted, is an operating wavelength of particular interest. Under bias, the imaginary part of the CdO permittivity at 1.55 µm is 0.15, whereas the corresponding value for indium oxide is 0.85.

The lower value for the imaginary part of the CdO permittivity indicates that under the model, cadmium oxide is expected to exhibit less loss than indium oxide at 1.55 µm when under bias. However, other factors are at work: Biasing the transparent conductor causes an accumulation layer about 1 nm thick to form next to the gate dielectric. A large electric field is confined within this accumulation layer. This field leads to optical absorption that is not taken into account by the assumptions that underlie the plots of FIGS. 5 and 6.

We performed FDTD simulations to compare ENZ modulators having similar designs but respectively using indium oxide and cadmium oxide transparent conductor films. The designs were similar to the design shown in FIG. 1A.

As modeled, the modulator was 5 µm long. It was integrated directly with a passive silicon ridge waveguide 290 nm in height and 400 nm in width on a silicon-on-insulator wafer. The integrated MOS-like structure included a doped silicon layer as a lower contact, a hafnium dioxide gate dielectric layer 5 nm thick, a 10-nm-thick transparent conductor film (of, respectively, indium oxide or cadmium oxide) acting as the gate-tunable ENZ layer, and a 200-nm-thick metal gate contact of gold.

Hafnium dioxide was selected as the gate dielectric for its high dielectric constant, which is substantially greater than that of silicon dioxide.

Under bias at 1.55 µm, our simulations predicted a peak confined field of 11.5 V/m for indium oxide and 38.6 V/m for CdO. The optical absorption in the accumulation layer has a quadratic dependence on the electric field amplitude. From this, it can be understood why stronger absorption would be seen in the cadmium oxide device.

Figure 7:
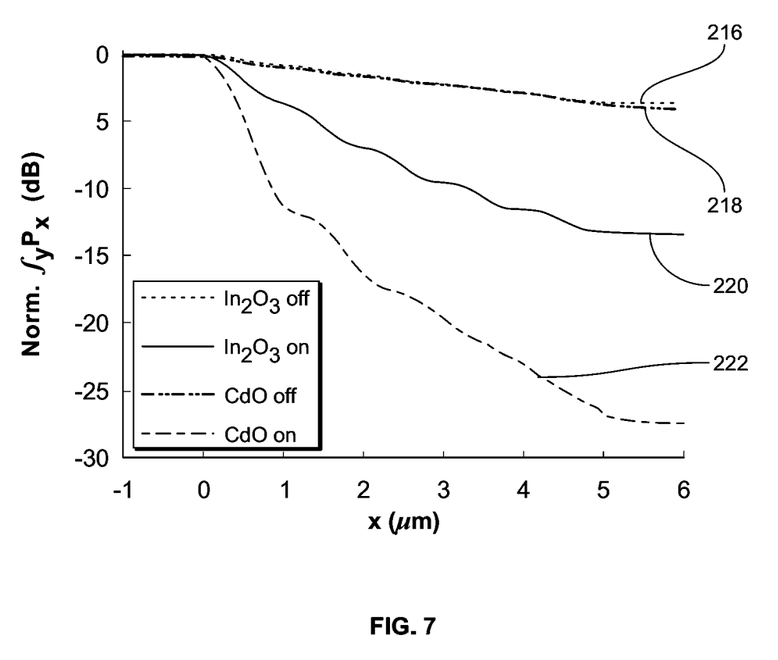
FIG. 7 is a plot, obtained from numerical simulations, of power versus propagation distance for the integrated power propagating through an example device of the kind described here.

FIG. 7 is a plot of the integrated power propagating through the device as a function of propagation distance at a wavelength of 1.55 µm, as predicted by our simulations. Curves 216 and 218 are respectively the indium oxide and CdO profiles in the unbiased state, and curves 220 and 222 are respectively the corresponding profiles under bias. It will be understood from the figure that the CdO device exhibits the greater modulation depth. It may be inferred from the figure that a modulator using CdO can achieve 5 dB modulation in a distance as short as 1 µm.

Figure 8A:
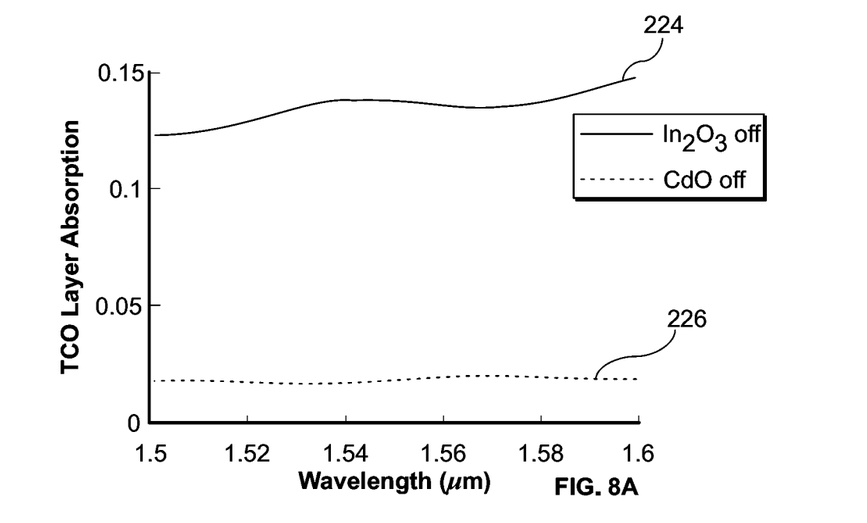
FIG. 8A describes the optical absorption per unit length in unbiased transparent conductor layers of indium oxide and cadmium oxide, respectively.
Figure 8B:
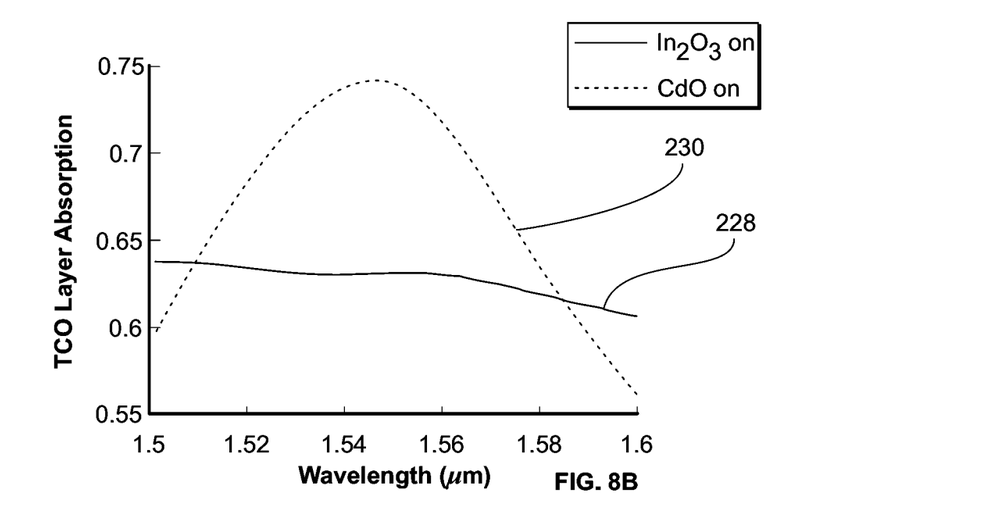
FIG. 8B describes the optical absorption per unit length in the same layers under bias.

FIG. 8A is a plot of the simulated optical absorption per unit length in the unbiased indium oxide layer (upper curve 224) and unbiased CdO layer (lower curve 226). FIG. 8B is a plot of the simulated optical absorption per unit length in the biased indium oxide layer (lower curve 228) and biased CdO layer (upper curve 230). It will be seen that the CdO film absorbs less light than the indium oxide film when unbiased, but that it absorbs more light when under bias. It will also be seen that the CdO response is distinctly peaked at 1.55 µm.

Figure 9:
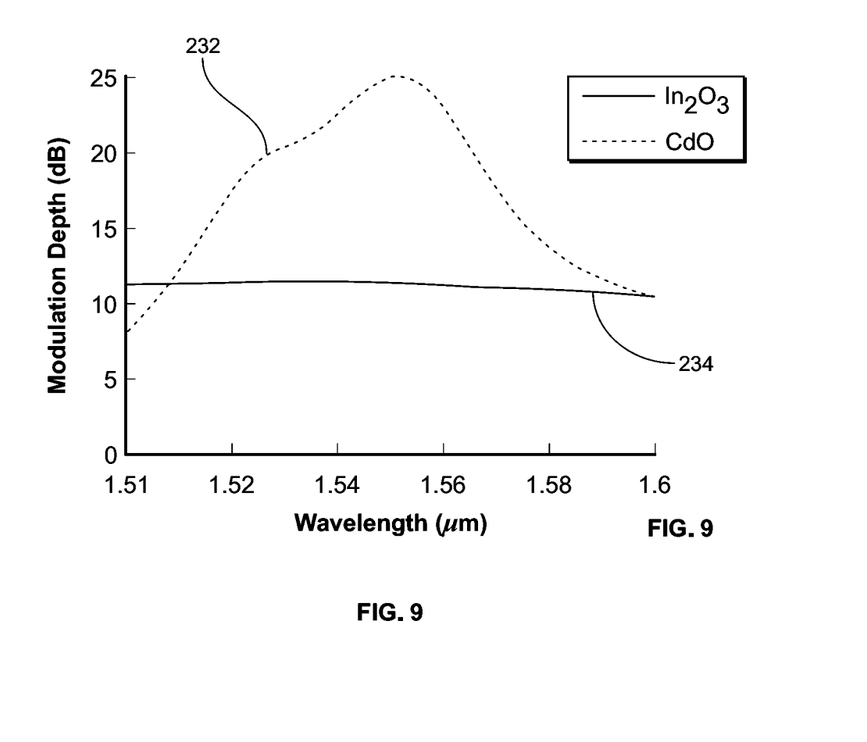
FIG. 9 is a plot, obtained from numerical simulations, of modulation depth versus wavelength for an example device of the kind described here. Two curves are presented, one for a transparent conductor of cadmium oxide, and the other for a transparent conductor of indium oxide.

FIG. 9 is a plot of the modulation depth as a function of wavelength for the simulated CdO modulator (curve 232) and indium oxide modulator (curve 234). It will be understood from the figure that the CdO modulator exhibits a peak modulation depth of 25 dB at 1.55 µm, with a steep decrease to 8 dB at 1.5 µm and 11 dB at 1.6 µm.

We attribute the narrow-band behavior to high carrier mobility in CdO (which leads to lower losses), and to the strong electric field confinement near the ENZ point. Despite the frequency-selective response, we still observe extinction ratios greater than 20 dB (or equivalently, greater than 4 dB/µm) over a bandwidth of 35 nm in the CdO device.

In summary, we have shown through numerical simulation that significant advantages can be realized in an ENZ electroabsorption modulator when CdO is used as the transparent conductor. The device design that served as the basis for our simulations was an unconventional design in which the bottom plate of the capacitive structure is not metallic, but consists instead of a doped portion of the semiconductor waveguide. A known choice for the gate dielectric material, hafnium dioxide, was adopted in our simulations.

We believe that a modulator using CdO can be further improved with a different choice of gate dielectric material. The reason is that even without bias, population of mid-bandgap and higher-lying interface states by electrons leads to a significant carrier accumulation at the interface between the CdO layer and the hafnium dioxide gate dielectric. This carrier accumulation interferes with the bias-induced accumulation and depletion of carriers needed for the modulator to operate.

CdO is unusual (although not unique) in having a band structure that energetically favors the populating of the interface states. More specifically, the charge neutrality level (CNL) of CdO (roughly, the energy of the highest filled interface state at the transition between a negative and a positive interfacial surface charge) lies above the bottom of the conduction band. This causes the Fermi level to be pinned above the conduction band edge, which, in turn, allows the interface states to be heavily populated.

We believe that other factors being equal, the more this interfacial carrier accumulation can be suppressed, the better the resulting modulator will perform.

The undesired carrier accumulation could be suppressed by reducing the interfacial density of states. (The density of states, roughly speaking, is the number of available states per unit energy.) The interface states arise, in part, because cadmium oxide and hafnium dioxide are crystallographically dissimilar. As a consequence, the crystal symmetry of cadmium oxide is broken at the interface. We believe that by replacing hafnium dioxide with a different gate dielectric material that is crystalographically similar to cadmium oxide, the interfacial density of states can be reduced, leading to less of the undesired carrier accumulation and to better modulator performance.

Magnesium oxide (MgO) is such a material. It has a cubic crystal structure with a lattice constant of 4.212 Å. Cadmium oxide likewise has a cubic crystal structure, with a lattice constant of 4.6958 Å. Cadmium oxide and magnesium oxide can be deposited sequentially in a sputtering tool without a break in the vacuum.

As noted above, the transparent conductor and the gate dielectric adjacent to it can be regarded as constituting a bilayer. As also noted, the bilayer is oriented in some embodiments with the transparent conductor adjacent to the semiconductor waveguide, and in other embodiments with the gate dielectric adjacent to (a doped portion of) the semiconductor waveguide. We believe that a superior modulator can be made, with either bilayer orientation, by constituting the bilayer with cadmium oxide for the transparent conductor and magnesium oxide for the gate dielectric.

It should be noted in this regard that a composite gate dielectric may be used, in which a layer of magnesium oxide forms the interface with CdO, and other dielectric materials are added to the side of the magnesium oxide layer opposite to the interface.

We claim:

1. Apparatus comprising:
   a semiconductor optical waveguide;
   a bilayer consisting of a transparent conductor layer and a gate dielectric layer next to the transparent conductor layer, wherein the bilayer overlies and directly contacts the semiconductor optical waveguide;
   a metal contact layer that overlies the bilayer;
   a first electrical contact electrically connected to the metal contact layer; and
   a second electrical contact electrically connected to a conductive layer that underlies the gate dielectric layer such that a voltage applied between the first contact and the second contact produces an electric field across the gate dielectric layer;
   wherein:
   the transparent conductor layer is optically coupled to the semiconductor optical waveguide and electrically coupled to the first or the second electrical contact;
   the transparent conductor layer comprises a transparent conducting oxide material; and
   the metal contact layer comprises titanium nitride or a metal or combination of metals selected from the group aluminum, copper, silver, gold;
   and wherein the layer of transparent conductor comprises cadmium oxide and the gate dielectric layer comprises magnesium oxide forming an interface with the cadmium oxide.

2. The apparatus of claim 1, wherein:
   the conductive layer that underlies the gate dielectric layer is constituted by a region of the semiconductor optical waveguide, consisting at least of a surface layer, that is doped to increase its electrical conductivity; and
   the bilayer is oriented such that the transparent conductor layer is adjacent to the metal contact layer and the gate dielectric layer is adjacent to the doped surface layer of the semiconductor optical waveguide.

3. The apparatus of claim 1, wherein:
   the conductive layer that underlies the gate dielectric layer is constituted by the transparent conductor layer; and
   the bilayer is oriented such that the transparent conductor layer is adjacent to the semiconductor optical waveguide and the gate dielectric layer is adjacent to the metal contact layer.

4. The apparatus of claim 1, wherein the semiconductor optical waveguide comprises silicon.

5. The apparatus of claim 1, wherein the semiconductor optical waveguide is a strip waveguide, a ridge waveguide, or a buried channel waveguide.

6. The apparatus of claim 1, wherein:
   the conductive layer that underlies the gate dielectric layer is constituted by a region of the semiconductor optical waveguide, consisting at least of a surface layer, that is doped to increase its electrical conductivity; and
   the doped surface layer extends on top of the semiconductor waveguide and on at least one lateral side of the semiconductor waveguide.

7. The apparatus of claim 1, wherein:
   the conductive layer that underlies the gate dielectric layer is constituted by a region of the semiconductor optical waveguide, consisting at least of a surface layer, that is doped to increase its electrical conductivity; and
   the doped surface layer, the gate dielectric layer, and the layer of transparent conductor are each formed on three sides of the semiconductor optical waveguide.

8. The apparatus of claim 1, wherein:
   the conductive layer that underlies the gate dielectric layer is constituted by a region of the semiconductor optical waveguide, consisting at least of a surface layer, that is doped to increase its electrical conductivity; and
   the doped surface layer, the gate dielectric layer, and the layer of transparent conductor are each formed at least on one lateral side of the semiconductor optical waveguide.

9. The apparatus of claim 1, wherein the transparent conductor layer comprises a material that responds to application of an electric field across the gate dielectric layer with an enhanced carrier concentration that attenuates a plasmonic-photonic mode.

10. The apparatus of claim 1, wherein the gate dielectric layer is transparent at wavelengths of operation of the apparatus.

11. The apparatus of claim 1, wherein:
   the bilayer is oriented such that the transparent conductor layer is adjacent to the metal layer and the gate dielectric layer is adjacent to the doped surface layer; and
   the second electrical contact is formed on the transparent conductor layer and is made from a material comprising at least one of the group consisting of: gold, silver, copper, aluminum doped semiconductors, and titanium nitride.

* * * * *